No. 836,731. PATENTED NOV. 27, 1906.
W. O. AMSLER.
GLASS MELTING FURNACE.
APPLICATION FILED FEB. 15, 1906.
2 SHEETS—SHEET 1.
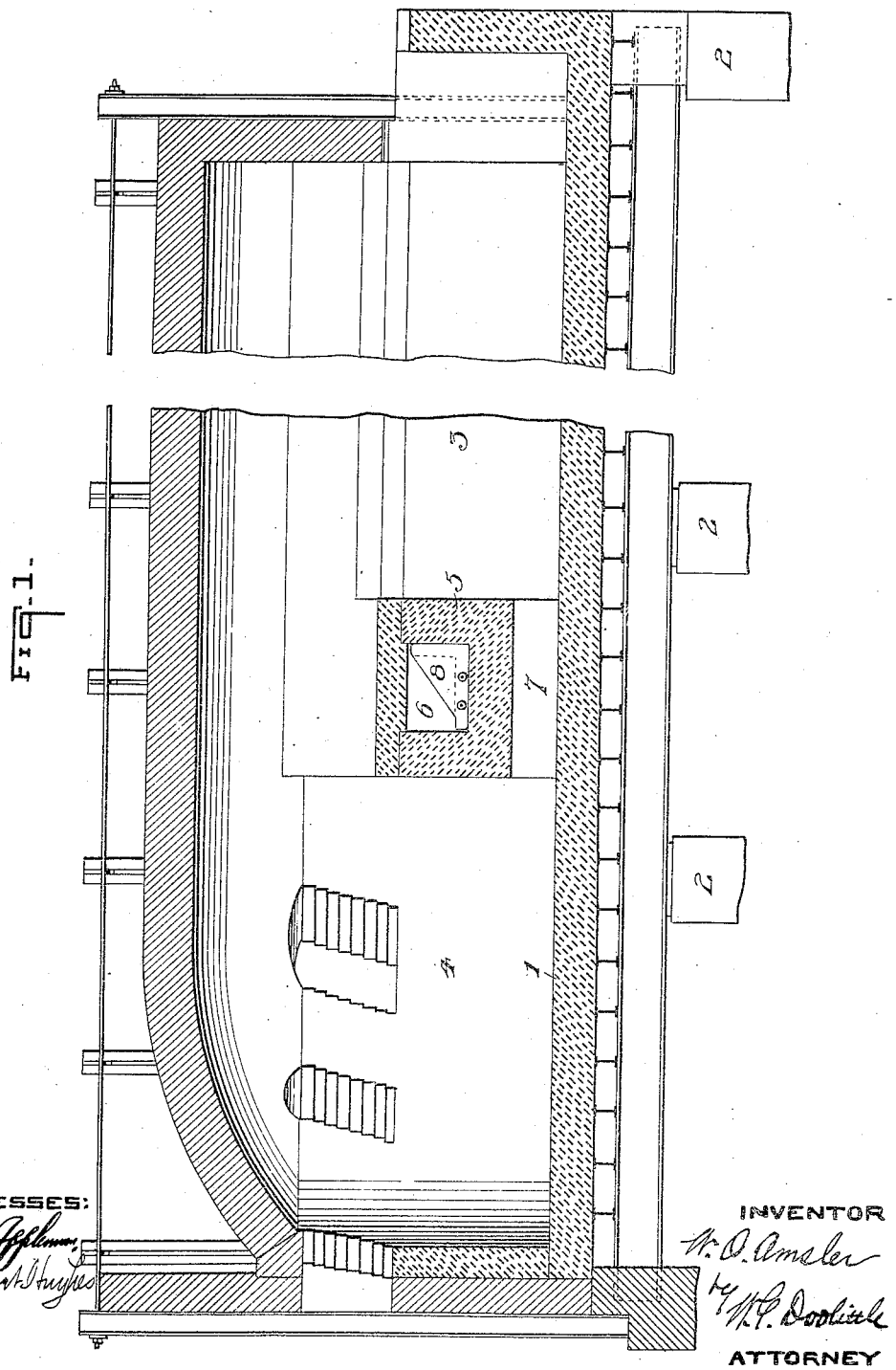
WITNESSES:
INVENTOR
ATTORNEY No. 836,731. PATENTED NOV. 27, 1906.
W. O. AMSLER.
GLASS MELTING FURNACE.
APPLICATION FILED FEB. 15, 1906.
2 SHEETS—SHEET 2.
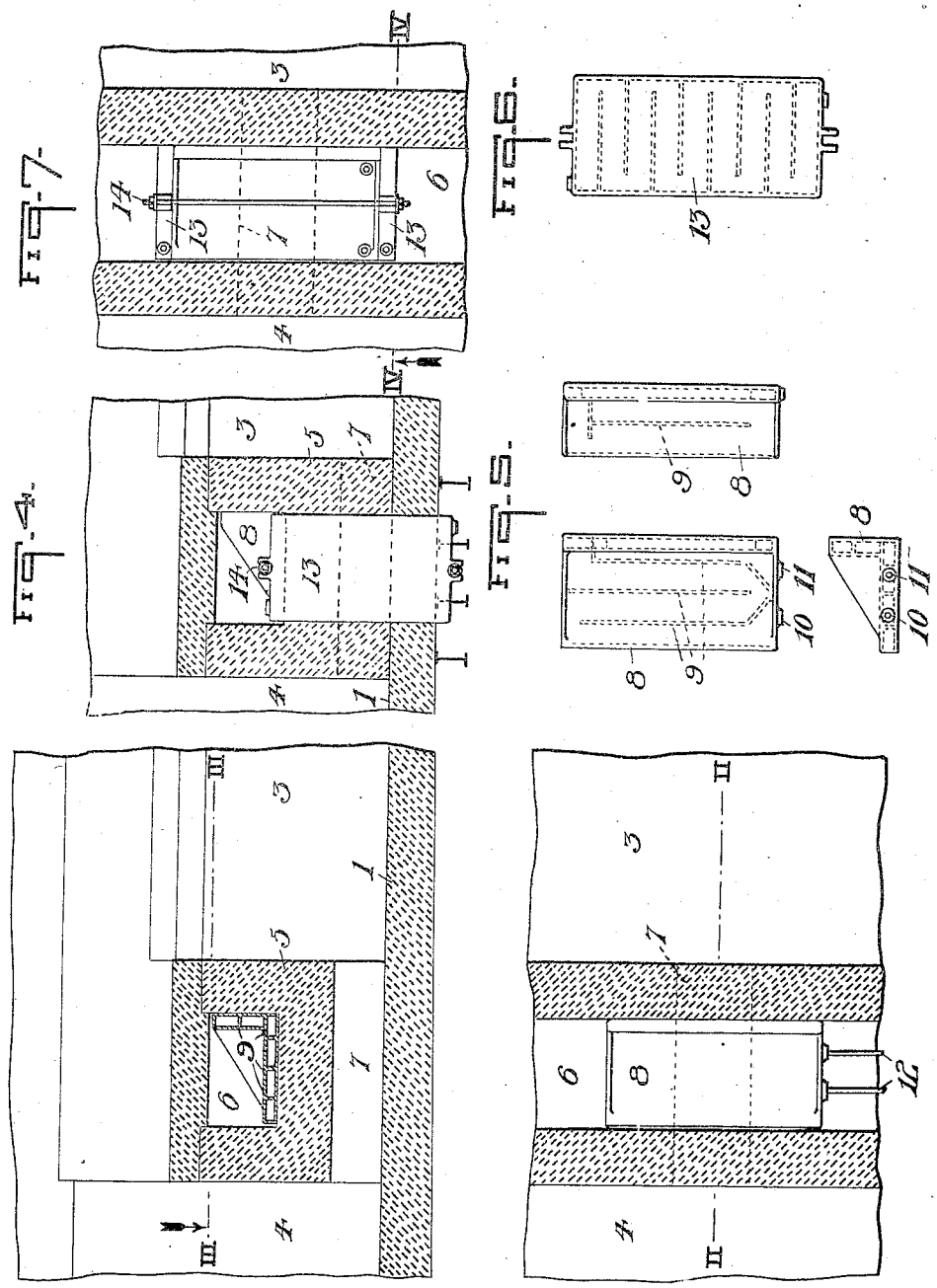

UNITED STATES PATENT OFFICE.

WALTER O. AMSLER, OF PITTSBURG, PENNSYLVANIA, ASSIGNOR TO THE AMSLER ENGINEERING COMPANY, OF PITTSBURG, PENNSYLVANIA, A CORPORATION OF PENNSYLVANIA.

GLASS-MELTING FURNACE.

No. 836,731.

Specification of Letters Patent.

Patented Nov. 27, 1906.

Application filed February 15, 1906. Serial No. 301,209.

*To all whom it may concern:*

Be it known that I, WALTER O. AMSLER, a citizen of the United States, residing at Pittsburg, in the county of Allegheny and State of Pennsylvania, have invented new and useful Improvements in Glass-Melting Furnaces, of which the following is a specification.

My invention relates to glass-melting furnaces, and more particularly to that class of continuous melting-furnaces comprising a tank divided into two compartments by a bridge or partition wall.

In furnaces of this class as heretofore constructed much trouble and expense has occurred by reason of the wearing away of that portion of the bridge-wall nearest the passage connecting the two compartments of the tank.

The primary object of the present invention is to provide simple and efficient means to preserve the bridge-wall and to prevent the disintegration of that portion of the wall nearest the passage connecting the two compartments above referred to.

To this end my invention consists of a glass-melting furnace in the novel features of construction and in the combination of parts, all as fully hereinafter described and claimed.

In the accompanying drawings, which illustrate applications of my invention, Figure 1 is a broken vertical longitudinal sectional view of a furnace embodying my invention; Fig. 2, a similar detail view, particularly showing the central portion of the bridge-wall; Fig. 3, a detail horizontal sectional view of bridge-wall, taken on line III III of Fig. 2; Fig. 4, a vertical sectional view taken on line IV IV of Fig. 7, showing additional cooling-plates; Fig. 5, detail views of the cooling-plate employed in the form of Fig. 1; Fig. 6, a detail side view of the additional cooling-plate shown in Fig. 4, and Fig. 7 a detail horizontal sectional view showing the location of the cooling-plates in the bridge-wall.

Referring to the drawings, the tank of the furnace, as illustrated and as preferred, is formed with a suitable bottom floor 1 and supported by columns 2. The tank is divided into two compartments 3 and 4 by bridge-wall 5. Bridge-wall 5 extends entirely across the furnace and is formed with an opening or air-space 6. In addition to the air-space 6 the bridge-wall is constructed with a central passage 7, designed to connect the two compartments and permit the passage of molten glass from the melting-compartment 3 to the working-out compartment 4. Located within the opening or air-space 6 and near the passage 7 I employ means for effecting a circulation of a cooling fluid for the purposes of cooling that portion of the wall most likely to be affected in the operation of the furnace.

In the form of Fig. 1 I employ an angular plate 8, formed with a plurality of fluid-passages 9, an inlet tap-hole 10, and an outlet tap-hole 11. Said inlet and outlet each communicate with pipes 12, adapted to convey a fluid to and from the plate 8. The arrangement of the passages in said plate is particularly shown in the detail views of Fig. 5.

In the form of Fig. 7 in addition to the plate 8 I have shown vertical cooling-plates 13, said plates being joined by cross-rods 14.

What I claim is—

1. In a glass-melting furnace, a tank, a bridge-wall dividing the tank into compartments, a passage connecting the compartments, means in the bridge-wall comprising a plate formed with passages for effecting a circulation of a cooling fluid near the passage connecting the compartments therein.

2. In a glass-melting furnace, a tank, a bridge-wall formed with an air-space dividing the tank into compartments, a passage connecting the compartments, means in the air-space for effecting a circulation of a cooling fluid near the said passage.

3. In a glass-melting furnace, a tank, a bridge-wall formed with an air-space dividing the tank into two compartments, a passage connecting the compartments, and a cooling-fluid plate located in the air-space above and near the said passage.

4. In a glass-melting furnace, a tank, a bridge-wall dividing the tank into two compartments, a passage connecting the two compartments, and a cooling-fluid plate located in the bridge-wall above and near the passage connecting the compartments.

5. In a glass-melting furnace, a tank, a bridge-wall dividing the tank into two compartments, a passage connecting the compartments, an angular cooling-plate provided with passages for the circulation of a cooling fluid therein, said plate located in the bridge-wall near the passage connecting the two compartments.

6. In a glass-melting furnace, a tank, a bridge-wall dividing the tank into two compartments, a passage connecting the compartments, means in the bridge-wall, located near the passage connecting the two compartments, for effecting a circulation of a cooling fluid comprising a horizontally-disposed cooling-plate and vertical cooling-plates.

7. In a glass-melting furnace, a tank, a bridge-wall formed with an air-space dividing the tank into two compartments, a passage connecting the two compartments, an angular cooling-plate provided with passages for a cooling fluid located in the air-space and near the passage connecting the two compartments.

8. In a glass-melting furnace, a tank, a bridge-wall formed with an air-space dividing the tank into two compartments, a passage connecting the compartments, an angular horizontally-disposed cooling-plate provided with passages for a cooling fluid, vertically-disposed cooling-plates also formed with passages for a cooling fluid, said cooling-plates located in the air-space and near the passage connecting the two compartments.

In testimony whereof I affix my signature in presence of two subscribing witnesses.

WALTER O. AMSLER.

Witnesses:
W. G. DOOLITTLE,
MARGARET HUGHES.